United States Patent
Yamaoka

(10) Patent No.: US 10,414,211 B2
(45) Date of Patent: *Sep. 17, 2019

(54) PNEUMATIC TIRE

(71) Applicant: Sumitomo Rubber Industries, Ltd., Kobe-shi, Hyogo (JP)

(72) Inventor: Hiroshi Yamaoka, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 59 days.

This patent is subject to a terminal disclaimer.

(21) Appl. No.: 15/130,579

(22) Filed: Apr. 15, 2016

(65) Prior Publication Data
US 2016/0303919 A1 Oct. 20, 2016

(30) Foreign Application Priority Data
Apr. 17, 2015 (JP) .................. 2015-084684

(51) Int. Cl.
*B60C 11/03* (2006.01)
*B60C 11/13* (2006.01)
*B60C 11/12* (2006.01)

(52) U.S. Cl.
CPC ...... *B60C 11/0332* (2013.01); *B60C 11/0306* (2013.01); *B60C 11/0311* (2013.01);
(Continued)

(58) Field of Classification Search
CPC ............. B60C 11/0332; B60C 11/0306; B60C 11/1384; B60C 11/1392; B60C 2200/04
See application file for complete search history.

(56) References Cited

U.S. PATENT DOCUMENTS 4,815,511 A * 3/1989 Brayer ............... B60C 11/0083
152/209.14
5,769,977 A * 6/1998 Masaoka ............ B60C 11/0302
152/209.23
(Continued)

FOREIGN PATENT DOCUMENTS

EP 0 454 394 A1 10/1991
EP 2 281 698 A1 2/2011
(Continued)

OTHER PUBLICATIONS

Machine translation of JP2012188080A (Year: 2012).*
Extended European Search Report, dated Sep. 16, 2016, for European Application No. 16164366.3.

*Primary Examiner* — Robert C Dye
*Assistant Examiner* — Nicholas R Krasnow
(74) *Attorney, Agent, or Firm* — Birch, Stewart, Kolasch & Birch LLP

(57) ABSTRACT

A pneumatic tire includes a tread portion being provided with at least one circumferentially and continuously extending main groove and at least one land portion adjacent to the main groove. The land portion includes a corner portion formed between a ground contact surface and a sidewall of the land portion on the side of the main groove. The land portion is provided with a lug groove extending from the main groove and terminating within the land portion. The corner portion includes a chamfered portion and a non-chamfered portion. The chamfered portion includes a first end in communication with the lug groove.

13 Claims, 8 Drawing Sheets

(52) U.S. Cl.
CPC .......... *B60C 11/12* (2013.01); *B60C 11/1307* (2013.01); *B60C 11/1392* (2013.01); *B60C 2011/0334* (2013.01); *B60C 2011/0341* (2013.01); *B60C 2011/0365* (2013.01); *B60C 2011/0372* (2013.01); *B60C 2011/0376* (2013.01); *B60C 2011/0386* (2013.01); *B60C 2011/133* (2013.01)

(56) References Cited

U.S. PATENT DOCUMENTS

| | | | |
|---|---|---|---|
| 9,358,843 B2 * | 6/2016 | Nakamura | B60C 11/0304 |
| D810,657 S * | 2/2018 | Yamaoka | D12/519 |
| 2003/0047262 A1 * | 3/2003 | Kousaie | B60C 11/13 |
| | | | 152/209.8 |
| 2006/0011279 A1 * | 1/2006 | Miyasaka | B60C 11/0306 |
| | | | 152/209.15 |
| 2006/0137791 A1 * | 6/2006 | Miyabe | B60C 11/0302 |
| | | | 152/209.18 |
| 2006/0151078 A1 * | 7/2006 | Colombo | B60C 11/0302 |
| | | | 152/209.8 |
| 2009/0188596 A1 * | 7/2009 | Kojima | B60C 11/0309 |
| | | | 152/209.8 |
| 2009/0229721 A1 * | 9/2009 | Ikeda | B60C 11/0306 |
| | | | 152/209.18 |
| 2010/0206446 A1 * | 8/2010 | Oizumi | B60C 11/0306 |
| | | | 152/209.18 |
| 2010/0212792 A1 * | 8/2010 | Mita | B60C 11/0306 |
| | | | 152/209.9 |
| 2010/0314012 A1 * | 12/2010 | Hada | B60C 11/0306 |
| | | | 152/209.16 |
| 2010/0326577 A1 * | 12/2010 | Iwai | B60C 11/0309 |
| | | | 152/209.24 |
| 2013/0112325 A1 * | 5/2013 | Mukai | B60C 11/1369 |
| | | | 152/209.8 |
| 2013/0146190 A1 * | 6/2013 | Aoki | B60C 11/0306 |
| | | | 152/209.18 |
| 2013/0167995 A1 * | 7/2013 | Hada | B60C 11/0306 |
| | | | 152/209.9 |
| 2013/0167997 A1 * | 7/2013 | Hayashi | B60C 11/04 |
| | | | 152/209.18 |
| 2013/0199684 A1 * | 8/2013 | Sakamoto | B60C 11/0306 |
| | | | 152/209.18 |
| 2013/0263991 A1 * | 10/2013 | Fujii | B60C 13/02 |
| | | | 152/523 |
| 2014/0318676 A1 * | 10/2014 | Kawakami | B60C 11/11 |
| | | | 152/209.15 |
| 2015/0020937 A1 * | 1/2015 | Nakamura | B60C 11/042 |
| | | | 152/209.8 |
| 2015/0202928 A1 * | 7/2015 | Akashi | B60C 11/0306 |
| | | | 152/209.25 |
| 2015/0231928 A1 * | 8/2015 | Sato | B60C 11/03 |
| | | | 152/209.18 |
| 2016/0082780 A1 * | 3/2016 | Nagahara | B60C 11/042 |
| | | | 152/209.18 |
| 2016/0121658 A1 * | 5/2016 | Skurich | B60C 11/0327 |
| | | | 152/209.18 |
| 2016/0144668 A1 * | 5/2016 | Oba | B60C 11/0306 |
| | | | 152/209.25 |
| 2016/0152084 A1 * | 6/2016 | Murata | B60C 11/0306 |
| | | | 152/209.8 |
| 2016/0193884 A1 * | 7/2016 | Takemoto | B60C 11/1281 |
| | | | 152/209.18 |
| 2016/0221397 A1 * | 8/2016 | Maehara | B60C 11/0306 |
| 2016/0375728 A1 * | 12/2016 | Kuriyama | B60C 11/0306 |
| | | | 152/209.8 |
| 2017/0106703 A1 * | 4/2017 | Kubo | B60C 11/0304 |
| 2017/0120688 A1 * | 5/2017 | Murata | B60C 11/1204 |
| 2017/0210175 A1 * | 7/2017 | Yoshimura | B60C 11/0304 |
| 2017/0305201 A1 * | 10/2017 | Akashi | B60C 11/03 |

FOREIGN PATENT DOCUMENTS

| | | |
|---|---|---|
| EP | 2 738 019 A1 | 6/2014 |
| EP | 2 829 421 A1 | 1/2015 |
| JP | 2010-285035 A | 12/2010 |

* cited by examiner

PNEUMATIC TIRE

BACKGROUND ART

Field of the Invention

The present invention relates to pneumatic tires, and in particular to a pneumatic tire capable of improving on driving performance on ice, snow and other winter conditions.

Description of the Related Art

Japanese Unexamined Patent Application Publication No. 2010-285035 discloses a winter pneumatic tire including a tread portion provided with a main groove and a plurality of lug grooves extending from the main groove. The winter tire, for example, may improve snow-shearing force by the lug grooves when driving in snow. Unfortunately, in such a tire, there is room for improvement of driving performance on snow as compared with a block patterned tire.

SUMMARY OF THE INVENTION

In view of the above problems in the conventional art, the present invention has an object to provide a pneumatic tire capable of improving on driving performance on ice, snow and other winter conditions by providing a lug groove and a chamfered portion on a tread land portion.

According to one aspect of the invention, a pneumatic tire includes a tread portion being provided with at least one circumferentially and continuously extending main groove and at least one land portion adjacent to the main groove. The land portion includes a ground contact surface, a sidewall and a corner portion formed between the ground contact surface and the sidewall on the side of the main groove. The land portion is provided with a lug groove extending from the main groove and terminating within the land portion. The corner portion includes a chamfered portion and a non-chamfered portion, and the chamfered portion includes a circumferential first end in communication with the lug groove.

In another aspect of the invention, the lug groove may be inclined at an angle with respect to an axial direction of the tire so as to form an acute angled portion formed between the main groove and the lug groove on the ground contact surface, and the chamfered portion may be provided on the side of the acute angled portion.

In another aspect of the invention, the non-chamfered portion may be provided on the side of an obtuse angled portion formed between the main groove and the lug groove of the ground contact surface.

In another aspect of the invention, the chamfered portion may be formed in a plane shape in a cross-section of the land portion.

In another aspect of the invention, the land portion may be provided with a sipe extending from the main groove along the lug groove, and the chamfered portion may include a circumferential second end in communication with the sipe.

In another aspect of the invention, the lug groove may have a width decreasing toward a terminal end in stages.

In another aspect of the invention, the at least one main groove may include a shoulder main groove and a crown main groove, the at least one land portion may include a middle land portion defined between the shoulder main groove and the crown main groove, the lug groove may include an inner lug groove extending from the crown main groove and an outer lug groove extending from the shoulder main groove, and the chamfered portion may include an inner chamfered portion in communication with the inner lug groove and an outer chamfered portion in communication with the outer lug groove.

In another aspect of the invention, the inner chamfered portion may be in communication with the inner lug groove on a first side in a circumferential direction of the tire, and the outer chamfered portion may be in communication with the outer lug groove on a second side in the circumferential direction of the tire.

DESCRIPTION OF THE PREFERRED EMBODIMENTS

An embodiment of the present invention will be explained below with reference to the accompanying drawings.

Figure 1:
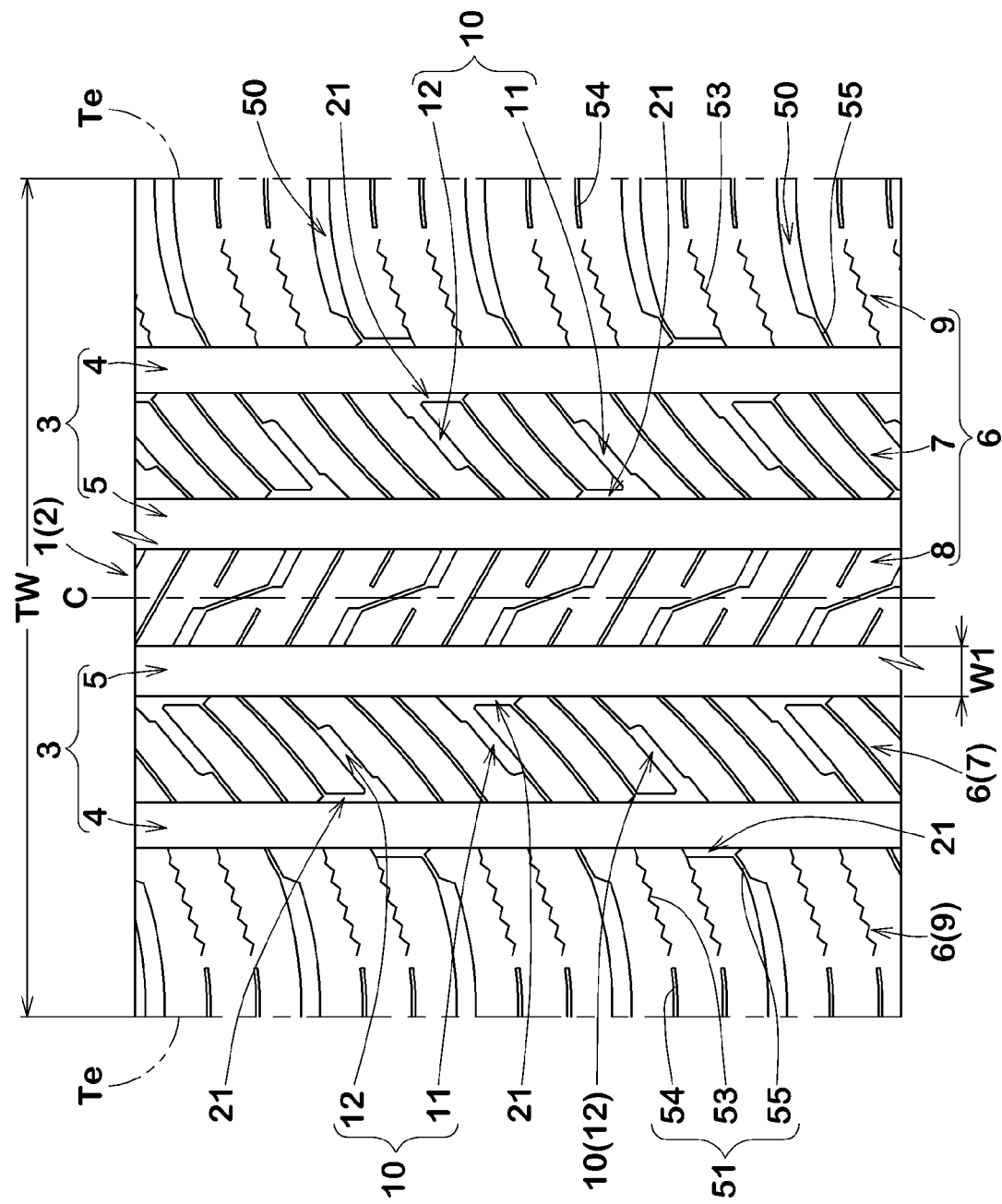
FIG. 1 is a development view of a tread portion of a pneumatic tire in accordance with an embodiment of the invention.

FIG. 1 illustrates a development view of a tread portion 2 of a pneumatic tire 1 in accordance with an embodiment of the invention. The tire 1 may preferably be embodied as a winter tire for passenger cars, for example. As illustrated in FIG. 1, the tread portion 2 is provided with at least one circumferentially and continuously extending main groove 3 and at least one land portion 6 adjacent to the main groove 3.

The main groove 3, for example, includes a shoulder main groove 4 and a crown main groove 5 on each side of the tire equator C. The shoulder main groove 4, for example, is located proximate to a tread edge Te.

As used herein, the tread edge Te on each side of the tire equator C is the axial outermost edges of the ground contacting patch which occurs under a normally inflated loaded condition when the camber angle of the tire is zero.

As used herein, the normally inflated loaded condition is such that the tire is mounted on a standard wheel rim with a standard pressure and is loaded with a standard tire load.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is the "maximum load capacity" in JATMA, the "Load Capacity" in ETRTO, and the maximum value given in the above-mentioned table in TRA or the like.

In this application including specification and claims, various dimensions, positions and the like of the tire refer to those under a normally inflated unloaded condition of the tire unless otherwise noted.

As used herein, the normally inflated unloaded condition is such that the tire is mounted on the standard wheel rim with the standard pressure but is loaded with no tire load.

As used herein, the tread width TW is the width measured under the normally inflated unloaded condition, as the axial distance between the tread edges Te determined as above.

The crown main groove 5, for example, is disposed axially inward of the shoulder main groove 4. In this embodiment, a pair of the crown main grooves 5 is disposed so as to include the tire equator C therebetween, for example. Alternatively, a single crown main groove 5 may be disposed on the tire equator C, for example.

Each main groove 4 and 5, for example, extends in a straight shape along the circumferential direction of the tire. Alternatively, each main groove 4 and 5 may extend in a zigzag or wavy shape in the circumferential direction of the tire.

Preferably, a width W1 of each main groove 4 and 5, for example, is in a range of from 2% to 9% of the tread width TW. Preferably, a depth of each main groove 4 and 5, for example, is in a range of from 6.5 to 8.5 mm. These main grooves 4 and 5 may improve not only steering stability on dry condition but also driving performance on ice and snow conditions, in good balance.

The land portion 6, for example, includes a middle land portion 7, a crown land portion 8 and a shoulder land portion 9.

The middle land portion 7 is disposed between the shoulder main groove 4 and the crown main groove 5 on each side of the tire equator C. The middle land portions 7, for example, are configured as a point symmetrical manner with respect to a point on the tire equator C.

Figure 2:
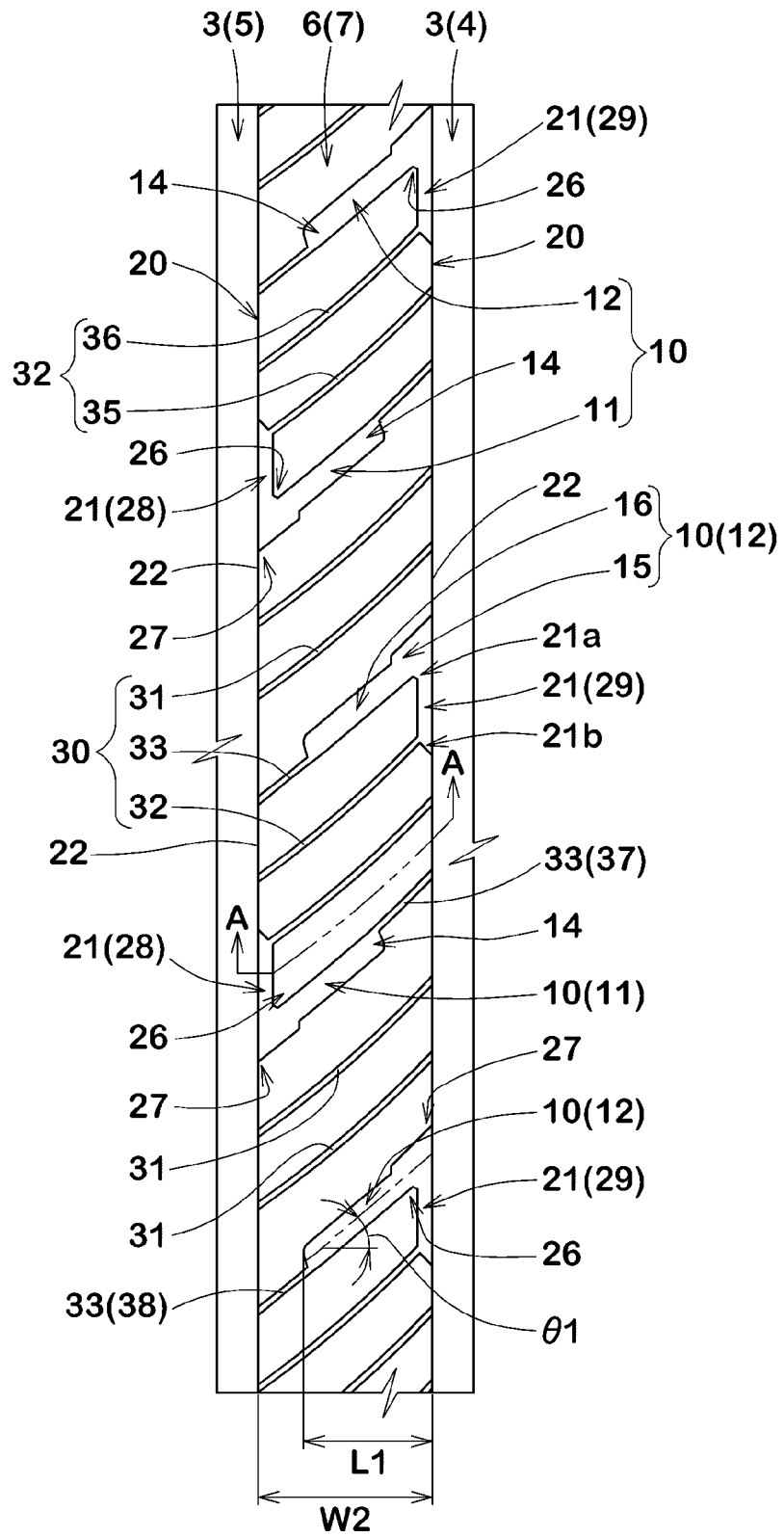
FIG. 2 is an enlarged view of a middle land portion of FIG. 1.

FIG. 2 illustrates an enlarged view of the right side middle land portion 7 of FIG. 1. As illustrated in FIG. 2, the middle land portion 7 is provided with a plurality of middle lug grooves 10.

Each middle lug groove 10 extends from one of the main grooves to a terminal end 14 terminating within the land portion. The middle lug groove 10 may increase snow traction on snowy road by generating snow-shearing force while ensuring land portion rigidity.

The middle lug grooves 10 in accordance with the present embodiment, for example, include at least one inner lug groove 11 extending from the crown main groove 5 and terminating within the middle land portion 7, and at least one outer lug groove 12 extending from the shoulder main groove 4 and terminating within the middle land portion 7. In this embodiment, the inner lug groove 11 and the outer lug groove 12, for example, are arranged alternately in the circumferential direction of the tire.

The middle lug grooves 10, for example, are inclined at an angle $\theta 1$ with respect to the axial direction of the tire. Thus, the ground contact surface of the land portion 6 (middle land portion 7) forms an acute angled portion 26 formed between the main groove and the middle lug groove 10, and an obtuse angled portion 27 formed between the main groove and the middle lug groove 10.

Preferably, the angle $\theta 1$ of the middle lug grooves 10, for example, is in a range of from 20 to 60 degrees, more preferably in a range of from 35 to 45 degrees. Thus, the middle lug grooves 10 may increase traction on ice and snow conditions while improving cornering performance.

Preferably, the middle lug grooves 10 have widths decreasing toward the terminal ends 14 in stages. For example, each of the middle lug grooves 10 includes a wide portion 15 on the side of the main groove and a narrow portion 16 on the side of the terminal end 14. Such a middle lug groove 10 may reduce local rigidity change of the land portion to improve steering stability on dry road.

Preferably, the middle lug grooves 10 have axial lengths L1, for example, in a range of from 0.5 to 0.9 times of the width W2 of the middle land portion 7, more preferably in a range of from 0.6 to 0.8 times, in order to improve steering stability on dry road as well as driving performance on ice and snow roads in good balance.

Figure 3:
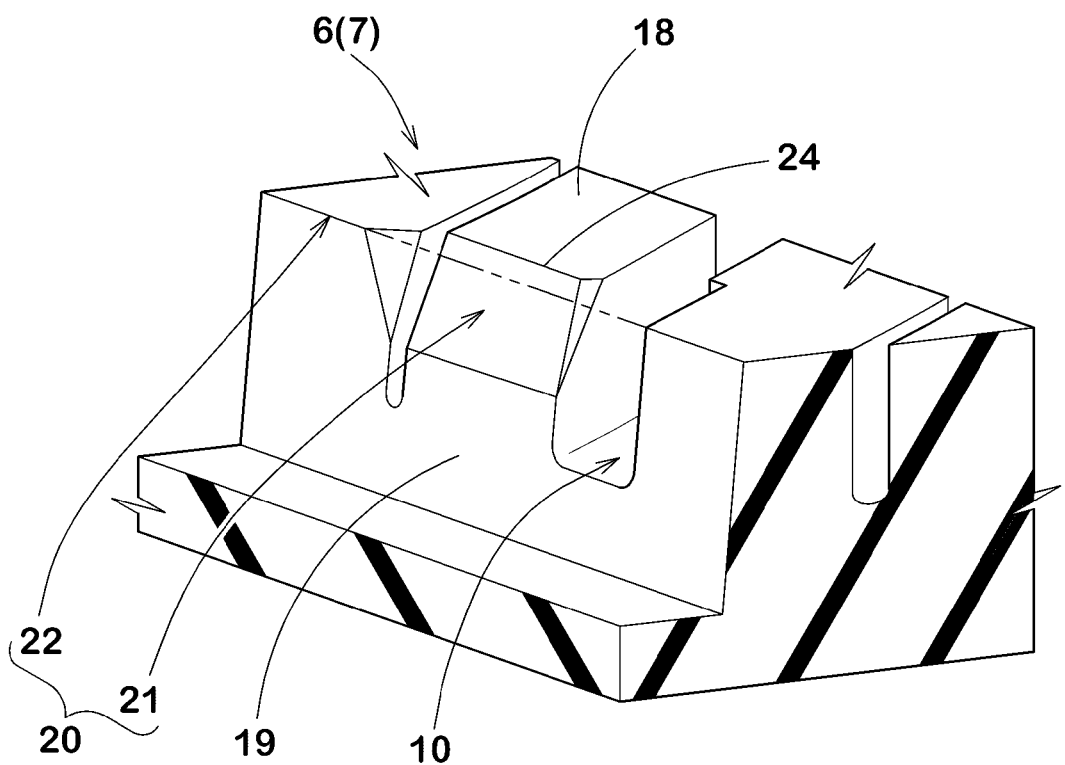
FIG. 3 is an enlarged perspective view of a chamfered portion of FIG. 2.

FIG. 3 illustrates an enlarged perspective view of a portion of FIG. 2. As illustrated in FIGS. 2 and 3, the land portion includes a corner portion 20 formed between the ground contact surface 18 and a sidewall 19 of the land portion. The corner portion 20 includes at least one chamfered portion 21 and at least one non-chamfered portion 22.

When driving on snow, the chamfered portion 21 may compress snow against the ground so as to form a snow column, and then the non-chamfered portion 22 may shear the snow column, thereby improving driving performance on snow.

In addition, the chamfered portion 21 includes a circumferential first end 21a in communication with one of the middle lug grooves 10. Thus, rigidity of the land portion around the intersection of the middle lug groove 10 and the main groove may gradually change, for example. Accordingly, local deformation on a portion around the middle lug groove 10 of the land portion can be suppressed when cornering, thereby improving steering stability on dry road.

Furthermore, the chamfered portion 21 in communication with both the middle lug groove 10 and the main groove may be useful to form a large snow column when driving on snow. The snow column formed by the chamfered portion 21 may connect firmly a snow column formed by the main groove with a snow column formed by the lug groove. Thus, the snow column formed by the middle lug groove may easily be removed from the tread portion 2 together with the snow column formed by the main groove as an integrated manner so as to offer a self-cleaning feature of the lug groove. Accordingly, the tire in accordance with the embodiment may offer an excellent on-snow performance.

Figure 4:
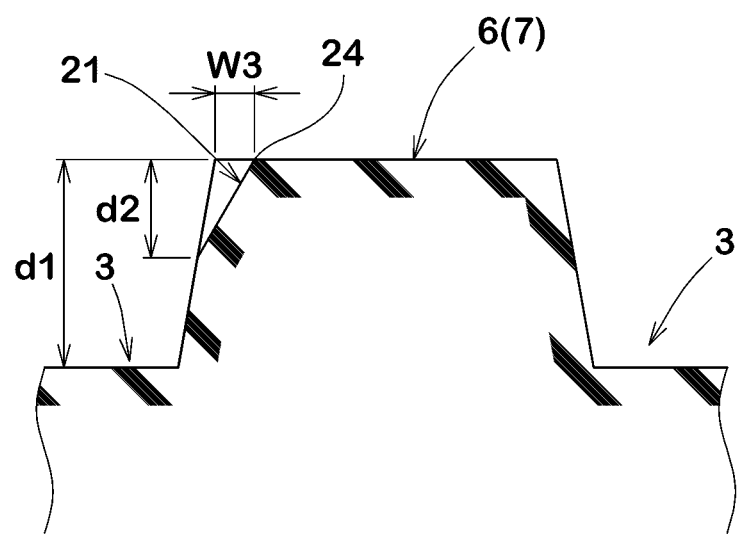
FIG. 4 is a cross-sectional view taken along a line A-A of FIG. 2.

The chamfered portion 21, for example, includes a slant surface extending radially inwardly from an edge 24 of the ground contact surface. In a cross-section of the land portion as illustrated in FIG. 4, the chamfered portion 21 is formed as a slant plane. Such a chamfered portion 21 may guide the snow which is pushed aside by the ground contact surface of the land portion into the main groove 3 smoothly when driving on snow road so that a strongly compressed snow column in the main groove can be obtained. Alternatively, the chamfered portion 21 may be formed as a curved surface, e.g., a convex or concave shape.

Preferably, the edge 24 of the chamfered portion 21, for example, extends in a straight shape along the circumferential direction. The edge 24 may prevent uneven wear of the ground contact surface of the land portion 6.

FIG. 4 illustrates a cross-sectional view of the land portion 6 taken along a line A-A of FIG. 2. As illustrated in FIG. 4, the chamfered portion 21 preferably has an axial width W3 in a range of from 0.05 to 0.15 times of the width W2 (shown in FIG. 2) of the middle land portion 7 in order to increase snow traction while ensuring sufficient rigidity of the land portion.

In the same point of view, the chamfered portion 21 preferably has a depth d2 in a range of not less than 0.30 times, more preferably not less than 0.45 times, but preferably not more than 0.70 times, more preferably not more than 0.55 times of the depth d1 of the main groove 3.

By offering the chamfered portion 21 as described above, a firmly integrated snow column which is formed by the middle lug groove 10 with the main groove 3 through the chamfered portion 21 can be obtained when driving on snow. Then, a large reaction force can be generated by shearing the snow column to improve on-snow performance.

As illustrated in FIG. 2, the chamfered portion 21 is provided on the side of the acute angled portion 26. This structure may help to further increase snow traction by firmly connecting snow columns formed by the main groove 3 and the middle lug groove 10 as compared with the chamfered portion 21 which is provided on the side of the obtuse angled portion 27.

In general, the acute angled portion 26 has a relatively low rigidity with respect to the obtuse angled portion 27. Thus, the acute angled portion 26 tends to elastically deform easily when coming into contact with the ground, and then the deformation of the acute angled portion 26 can be restored when leaving from the ground. In this embodiment, since the chamfered portion 21 is provided on the side of the acute angled portion 26, the snow column formed among the main groove, the lug groove and the chamfered portion may smoothly removed from these grooves using elastic restoration of the acute angled portion 26 during traveling.

In this embodiment, the at least one chamfered portion 21, for example, includes an inner chamfered portion 28 in communication with one of the inner lug grooves 11 and an outer chamfered portion 29 in communication with one of the outer lug grooves 12.

The inner chamfered portion 28 is in communication with the inner lug groove 11 on a first side in the circumferential direction of the tire. The outer chamfered portion 29 is in communication with the outer lug groove 12 on a second side in the circumferential direction of the tire which is an opposite side to the first side. In a preferred embodiment, the inner chamfered portion 28 and the outer chamfered portion 29 are provided on the side of the acute angled portions 26. This structure may offer uniform wear on each corner portion 20 of the land portion.

As illustrated in FIG. 3, the non-chamfered portion 22, for example, includes an edge where the ground contact surface 18 of the land portion intersects the sidewall 19 of the land portion. The edge is located outwardly in a width direction of the land portion with respect to the edge 24 of the chamfered portion 21 and forms a sharp corner having a low taper angle as compared with the edge 24 of the chamfered portion 21. Such an edge may increase friction by scratching icy road.

As illustrated in FIG. 2, the non-chamfered portion 22, for example, is provided on the side of the obtuse angled portion 27 formed between the middle lug groove 10 and the main groove. Since the relatively sharp edge of the non-chamfered portion 22 is arranged on the obtuse angled portion 27 which hardly deforms as compared with the acute angled portion 26, an excellent scratching effect that improves cornering performance of the tire on icy road can be offered.

The middle land portion 7, for example, is provided with a plurality of middle sipes 30. The middle sipes 30, for example, are inclined in the same direction as the middle lug grooves 10. In this embodiment, the middle sipes 30 extend along or substantially parallel with the middle lug grooves 10. The middle sipes may mitigate strain of the land portion when coming into contact with the ground and prevent uneven wear caused on the land portion. As used herein, a sipe refers to a narrow cut having a width of less than 2.0 mm.

The middle sipes 30, for example, include a main middle sipe 31, a sub middle sipe 32 and a connecting sipe 33.

The main middle sipe 31, for example, extends across perfectly the middle land portion 7. In this embodiment, the both ends of the main middle sipe 31 are in communication with the non-chamfered portions of the middle land portion 7. Furthermore, two main middle sipes 31, for example, are disposed between circumferentially adjacent inner lug groove 11 and the outer lug groove 12.

The sub middle sipe 32, for example, includes an end in communication with one of the chamfered portions 21. In this embodiment, the sub middle sipe 32, for example, is communicated with a circumferential second end 21b of the chamfered portion 21, wherein the second end 21b of the chamfered portion 21 is an opposite end to the first end 21a in communication with the middle lug groove 10. The sub middle sipe 32, for example, extends from the chamfered portion 21 to one of the non-chamfered portions 22 across the land portion. Thus, a piece of land portion between the sub middle sipe 32 and the middle lug groove 10 may elastically deform so as to push out snow introduced in the lug groove 10 effectively, thereby further improving on-snow performance.

In this embodiment, the sub middle sipe 32, for example, includes a first sub middle sipe 35 extending from the inner chamfered portion 28 to the shoulder main groove 4 and a second sub middle sipe 36 extending from the outer chamfered portion 29 to the crown main groove 5. This structure may prevent uneven wear of the ground contact surface on the middle land portion 7.

The connecting sipe 33, for example, includes a first connecting middle sipe 37 extending from the terminal end of the inner lug groove 11 to the shoulder main groove 4 and a second connecting middle sipe 38 extending from the terminal end of the outer lug groove 12 to the crown main groove 5. Thus, the inner lug groove 11 and the outer lug groove 12 may open easily so as to hold a lot of snow therein.

Figure 5:
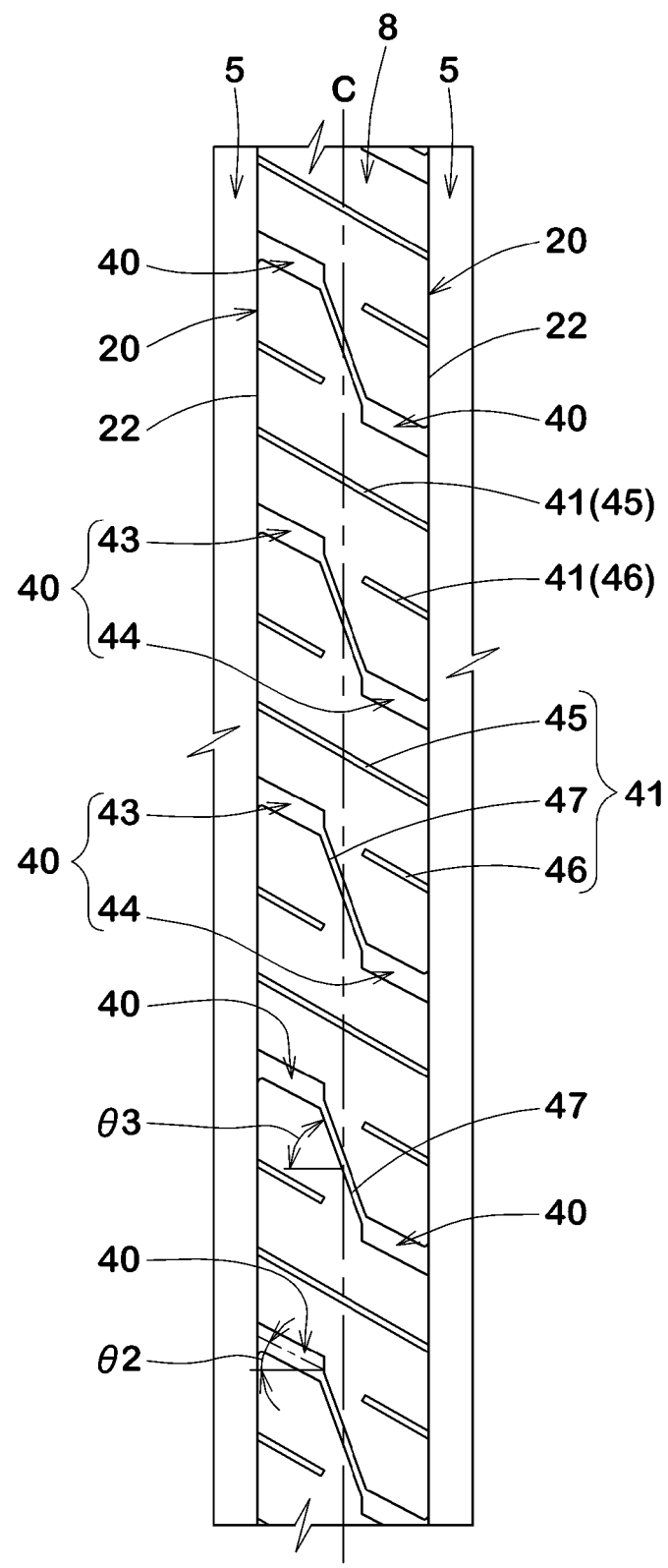
FIG. 5 is an enlarged view of a crown land portion of FIG. 1.

FIG. 5 illustrates an enlarged view of the crown land portion 8. As illustrated in FIG. 5, the crown land portion 8 is defined between the crown main grooves 5 and 5.

Preferably, a pair of corner portions 20 of the crown land portion 8 each between the ground contact surface and one of the sidewalls is configured as the non-chamfered portion 22 without having the chamfered portion 21. Thus, cornering performance of the tire on icy road can be improved through a scratching effect of the corner portions 20.

The crown land portion 8, for example, is provided with at least one crown lug groove 40 and at least one crown sipe 41. The crown lug groove 40, for example, extends from one of the crown main grooves 5 to an end 42 that terminates within the crown land portion 8. The crown lug groove 40 may increase snow traction while ensuring sufficient rigidity of the crown land portion 8.

Preferably, the crown lug groove 40 terminates without intersecting the tire equator C. Such a crown lug groove 40 may improve steering stability on dry road while further ensuring sufficient rigidity of the crown land portion 8.

Preferably, the crown lug groove 40 may be inclined in an opposite direction to the middle lug groove 10 (shown in FIG. 1). This structure may be useful to reduce lateral force deviation of the tire during traveling by canceling the lateral force to be generated from grooves 10 by the lateral force in an opposite direction to be generated from the grooves 40 with each other.

Preferably, the crown lug groove 40 has an angle θ2 with respect to the axial direction of the tire, and the angle θ2 is smaller than the angles θ1 of the middle lug grooves 10 with respect to the axial direction of the tire. More specifically, the angle θ2 of the crown lug groove 40 is preferably not less than 20 degrees, more preferably not less than 25 degrees, but preferably not more than 35 degrees, more preferably not more than 30 degrees, in order to increase friction against the ground in both axial and circumferential directions in good balance.

In this embodiment, the at least one crown lug groove 40 includes a first crown lug groove 43 extending from one of the crown main grooves 5 and a second crown lug groove 44 extending from the other one of the crown main grooves 5.

The first crown lug groove 43 and the second crown lug groove 44 are arranged in a staggered manner in the circumferential direction of the tire, for example. In addition, the first crown lug groove 43 and the second crown lug groove 44 are inclined in the same direction (e.g., upward to the left in FIG. 5). This structure may improve driving performance on ice and snow while preventing uneven wear of the crown land portion 8.

The at least one crown sipe 41, for example, extends in a straight shape with an inclination along the crown lug grooves 40.

The crown sipe 41, for example, includes a full-opened crown sipe 45, a semi-open crown sipe 46 and a connecting crown sipe 47.

The full-opened crown sipe 45 extends along the crown lug grooves 40 and connects the crown main grooves 5 and 5. The full-opened crown sipe 45 may offer a long sipe edge on the ground contact surface of the crown land portion to improve on-ice performance of the tire.

The semi-opened crown sipe 46, for example, extends from one of the crown main grooves 5 and terminates within the crown land portion 8. The semi-opened crown sipe 46, for example, extends along the crown lug grooves 40 without intersecting the tire equator C. The semi-opened crown sipe 46 also improves on-ice performance of the tire while ensuring sufficient rigidity of the crown land portion 8.

The connecting crown sipe 47, for example, extends from the first crown lug groove 43 to the second crown lug groove 44. The connecting crown sipe 47, for example, is inclined in a direction same as the crown lug grooves 40. Preferably, the connecting crown sipe 47 has an angle θ3 with respect to the axial direction of the tire, and the angle θ3 is greater than that of the crown lug grooves 40. The connecting crown sipe 47 may also improve cornering performance on icy road while ensuring sufficient circumferential rigidity of the crown land portion 8.

Preferably, the angle θ3 of the connecting crown sipe 47 is in a range of not less than 60 degrees, more preferably not less than 65 degrees, but preferably not more than 75 degrees, more preferably not more than 70 degrees, in order to improve steering stability on dry and icy roads in good balance.

Figure 6:
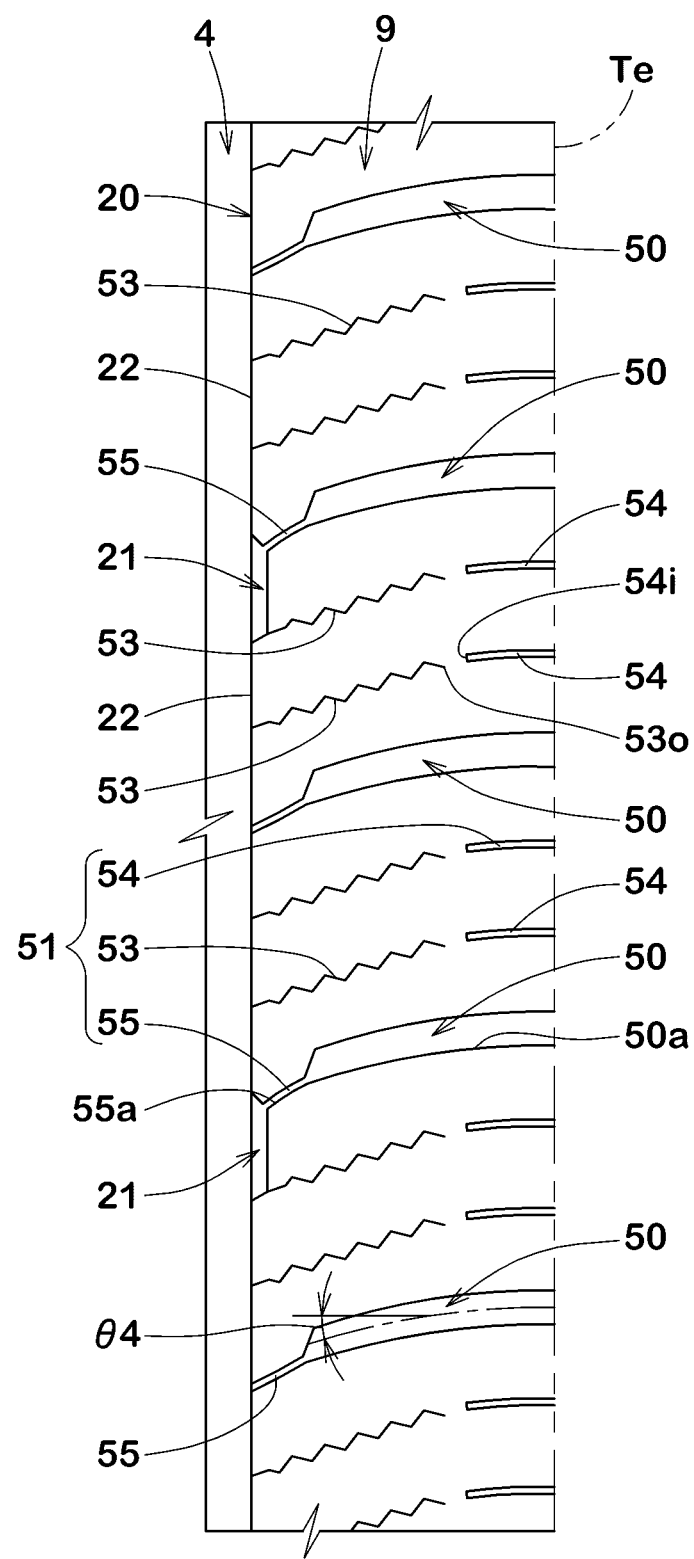
FIG. 6 is an enlarged view of a shoulder land portion of FIG. 1.

FIG. 6 illustrates an enlarged view of the shoulder land portion 9. As illustrated in FIG. 6, the shoulder land portion 9 is disposed axially outward of the shoulder main groove 4.

The shoulder land portion 9 also includes the corner portion 20 formed between the ground contact surface and the sidewall, wherein the corner portion 20 is provided with a plurality of chamfered portions 21 spaced in the circumferential direction of the tire. In this embodiment, the chamfered portions 21 on the shoulder land portion 9 have the same structure as the chamfered portion 21 on the middle land portion 7 as illustrated in FIGS. 2 and 3.

As illustrated in FIG. 1, each of the chamfered portions 21 on the shoulder land portion 9 preferably is arranged so that at least a part of the chamfered portion 21 and one of the middle lug grooves 10 of the middle land portion 7 face each other through the shoulder main groove 4. This structure may produce a large snow column when driving on snow, thereby improving on-snow performance.

As illustrated in FIG. 6, the shoulder land portion 9, for example, is provided with a shoulder lateral grooves 50 and shoulder sipes 51.

The shoulder lateral grooves 50, for example, extend axially inwardly from the tread edge Te and terminate within the shoulder land portion 9. The shoulder lateral grooves 50 may dispel rain snow and slush introduced therein through the tread edge Te.

Preferably, the shoulder lateral grooves 50, for example, are inclined in the same direction as the outer lug grooves 12 (shown in FIG. 1). Preferably, the shoulder lateral grooves 50 have an angle θ4 with respect to the axial direction of the tire, wherein the angle θ4 is smaller than that of the outer lug grooves 12. The shoulder lateral grooves 50 may improve traction on ice.

Preferably, the angle θ4 of the shoulder lateral grooves 50 is in a range of from 5 to 15 degrees. More preferably, the angle θ4 of the shoulder lateral grooves 50 decrease gradually toward the tread edge Te in order to improve wandering performance on ice.

The shoulder sipes 51, for example, include a first shoulder sipe 53, a second shoulder sipe 54 and a third shoulder sipe 55.

The first shoulder sipe 53, for example, is arranged between a pair of circumferentially adjacent shoulder lateral grooves 50 and 50. The first shoulder sipe 53 extends axially outwardly from the chamfered portion 21 or the non-chamfered portion 22 and terminates within the shoulder land portion 9. Preferably, the first shoulder sipe 53 is inclined in the same direction as the shoulder lateral grooves 50 in order to prevent uneven wear of the shoulder land portion 9.

In this embodiment, the first shoulder sipe 53, for example, extends in a zigzag shape. This structure may maintain rigidity of the shoulder land portion 9 to improve steering stability on dry road by engaging opposite sipe surfaces with each other.

The second shoulder sipe 54, for example, is arranged axially outward of the first shoulder sipe 53. That is, the second shoulder sipe 54 extends axially outwardly from an axially inner end 54i located axially outward of the axially outer end 53o of the first shoulder sipe 53. Preferably, the second shoulder sipe 54, for example, may be arranged on the location where the first shoulder sipe 53 is extended smoothly and imaginary axially outwardly to further increase traction on ice in cooperated with the first shoulder sipe 53.

The third shoulder sipe 55 extends so as to connect the shoulder main groove 4 and one of the shoulder lateral grooves 50. The third shoulder sipe 55 enables the shoulder lateral groove 50 to open widely to catch a lot of snow when coming into contact with snow road.

Preferably, one of sipe edges 55a of the third shoulder sipe 55 extends so as to continue smoothly with one of groove edges 50a of the shoulder lateral grooves 50. This structure may suppress uneven wear to be generated around a connecting portion between the third shoulder sipe 55 and the shoulder lateral groove 50.

Figure 7:
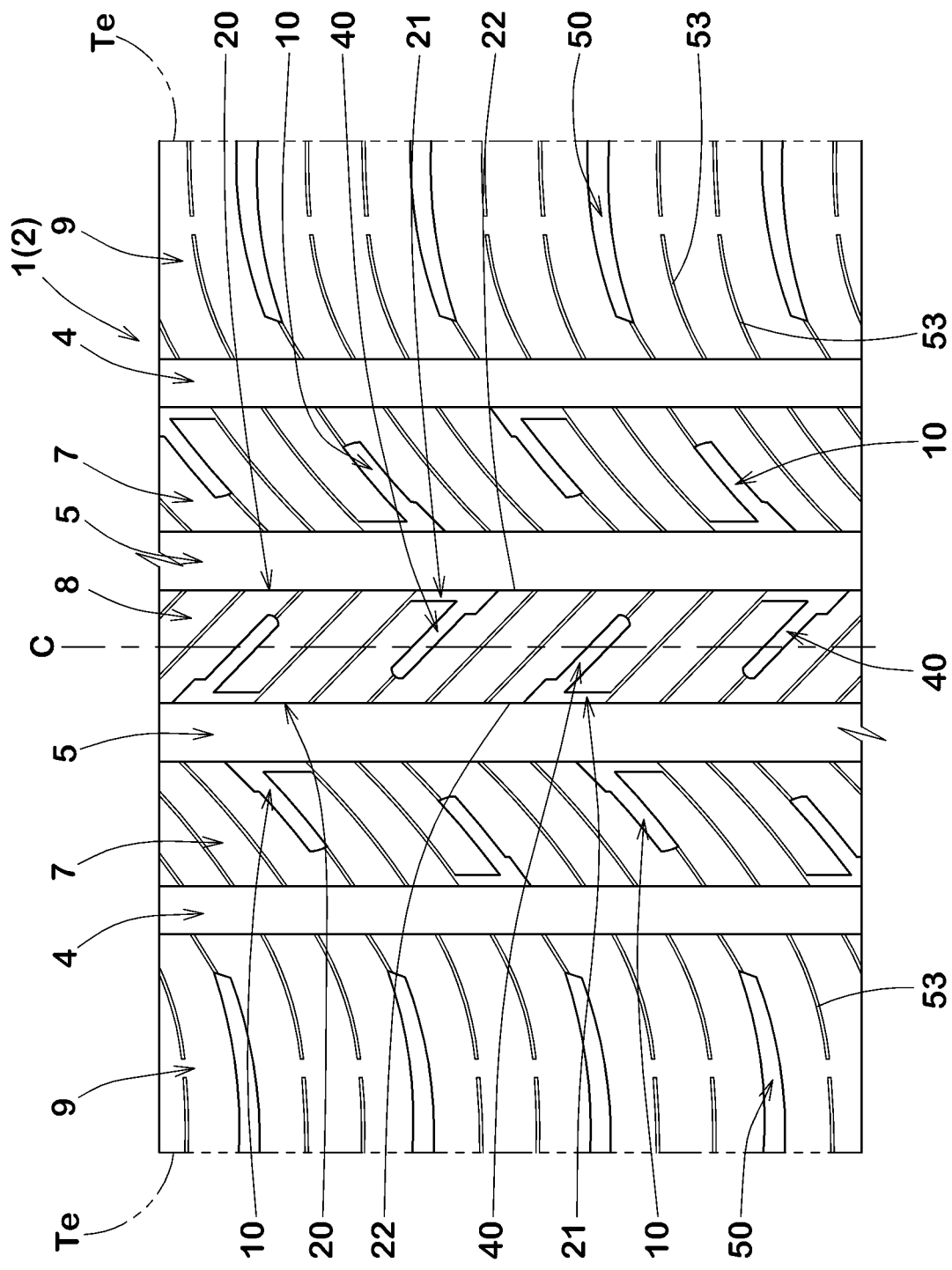
FIG. 7 is a development view of the tread portion of the pneumatic tire in accordance with another embodiment of the invention.

FIG. 7 illustrates a development view of the tread portion 2 of the tire 1 in accordance with another embodiment of the invention. In FIG. 7, it should be noted that like elements are denoted by the same reference numbers, and the detailed description thereof will not be repeated in the following.

In this embodiment, the crown land portion 8 employs a similar structure of the middle land portion illustrated in FIG. 1. For example, the crown land portion 8 is provided with a plurality of crown lug grooves 40 extending from one of the crown main grooves 5 and terminating within the crown land portion 8.

Each corner portion 20 of the crown land portion 8 formed between the ground contact surface and the sidewall is provided with at least one chamfered portion 21 and at least one non-chamfered portion 22. The chamfered portion 21 includes the circumferential first end in communication with the crown lug groove 40. This helps to form a large snow column when the crown main groove 5, the crown lug groove 40 and the chamfered portion 21 come into contact with a snow road at the same time, thereby increasing snow shearing force.

Preferably, the chamfered portion 21 on the crown land portion 8 is arranged so that a part of the chamfered portion 21 and one of the middle lug grooves 10 on the middle land portion 7 face with each other through the crown main groove 5.

In this embodiment, the first shoulder sipes 53 provided on the shoulder land portion 9 extends in a smooth curve shape to improve traction on ice.

While the particularly preferable embodiments in accordance with the present invention have been described in detail, the present invention is not limited to the illustrated embodiments, but can be modified and carried out in various aspects.

Example

Figure 8:
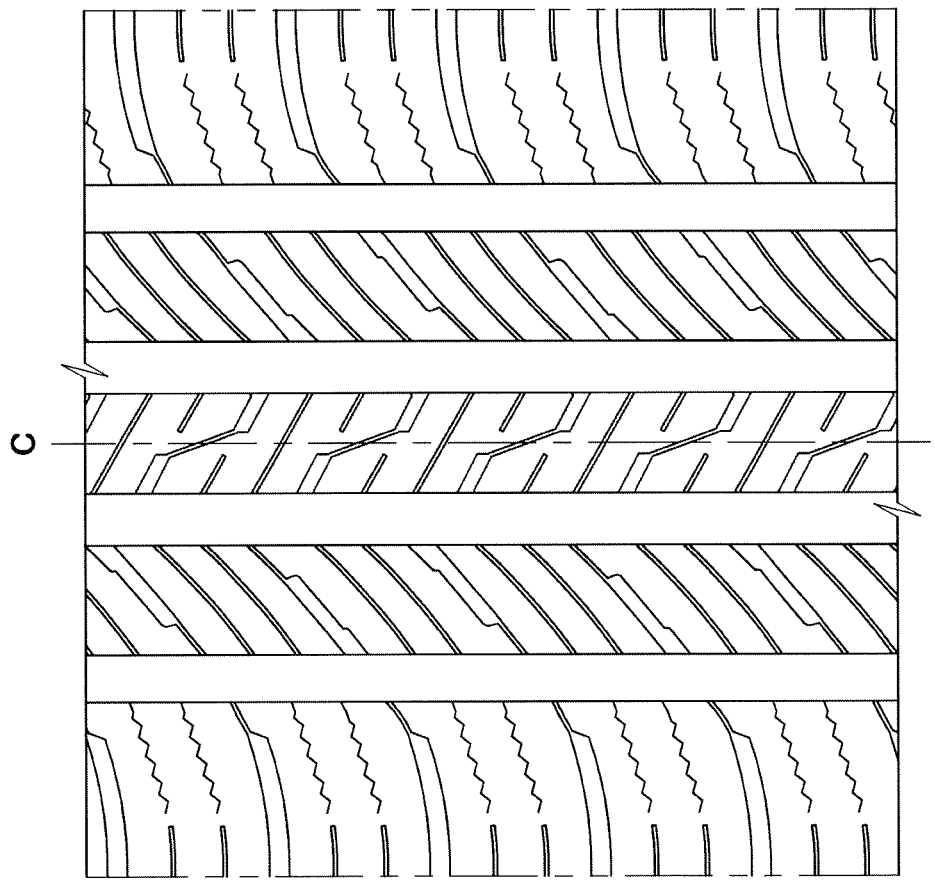
FIG. 8 is a development view of a tread portion of a pneumatic tire in accordance with a comparative example.

Pneumatic tires 215/60R16 having a basic tread pattern illustrated in FIG. 1 were manufactured based on the detail shown in Table 1. As for a comparative example, a pneumatic tires 215/60R16 having no chamfered portion, as illustrated in FIG. 8, was manufactured. Then, steering stability on dry, ice and snow of each test tire was tested. The common specification and the test method are as follows.

Rim: 16×6J

Tire inner pressure: 210 kPa

Test vehicle: Front wheel drive car with a 1,800 cc displacement

Test tire installing location: All wheels Steering stability test:

A test driver drove the test vehicle on dry, ice and snow roads, and evaluated steering stability such as the steering response during cornering, traction and cornering grip by his feeling. The results are indicated using a score of Ref. 1 being 100. The larger the value, the better the performance is.

The results are shown in Table 1. From the test results, it is confirmed that the example tires improve steering stability on ice and snow while ensuring driving performance on dry, as compared with the reference tire.

TABLE 1

|  | Ref. | Ex. 1 | Ex. 2 | Ex. 3 | Ex. 4 | Ex. 5 | Ex. 6 | Ex. 7 |
| --- | --- | --- | --- | --- | --- | --- | --- | --- |
| Tread pattern | FIG. 8 | FIG. 1 | FIG. 1 | FIG. 1 | FIG. 1 | FIG. 1 | FIG. 1 | FIG. 1 |
| Middle lug groove length L1/ Middle land portion width W2 | 0.70 | 0.70 | 0.50 | 0.60 | 0.80 | 0.90 | 0.70 | 0.70 |
| Middle lug groove angle θ1 (deg.) | 40 | 40 | 40 | 40 | 40 | 40 | 20 | 60 |
| Chamfered portion depth d2/main groove depth d1 | — | 0.30 | 0.30 | 0.30 | 0.30 | 0.30 | 0.30 | 0.30 |
| Chamfered portion width W3/ middle land portion width W2 | — | 0.10 | 0.10 | 0.10 | 0.10 | 0.10 | 0.10 | 0.10 |
| Chamfered portion on shoulder land portion | None | Provided | Provided | Provided | Provided | Provided | Provided | Provided |
| Steering stability on dry (score) | 100 | 102 | 103 | 103 | 101 | 99 | 103 | 101 |
| Steering stability on ice and snow (score) | 100 | 110 | 106 | 108 | 110 | 111 | 108 | 109 |

|  | Ex. 8 | Ex. 9 | Ex. 10 | Ex. 11 | Ex. 12 | Ex. 13 | Ex. 14 | Ex. 15 |
| --- | --- | --- | --- | --- | --- | --- | --- | --- |
| Tread pattern | FIG. 1 | FIG. 1 | FIG. 1 | FIG. 1 | FIG. 1 | FIG. 1 | FIG. 1 | FIG. 7 |
| Middle lug groove length L1/ Middle land portion width W2 | 0.70 | 0.70 | 0.70 | 0.70 | 0.70 | 0.70 | 0.70 | 0.70 |
| Middle lug groove angle θ1 (deg.) | 40 | 40 | 40 | 40 | 40 | 40 | 40 | 40 |
| Chamfered portion depth d2/main groove depth d1 | 0.30 | 0.45 | 0.55 | 0.70 | 0.30 | 0.30 | 0.30 | 0.30 |
| Chamfered portion width W3/ middle land portion width W2 | 0.10 | 0.10 | 0.10 | 0.10 | 0.05 | 0.15 | 0.10 | 0.10 |
| Chamfered portion on shoulder land portion | Provided | Provided | Provided | Provided | Provided | Provided | Provided | Provided |
| Steering stability on dry (score) | 103 | 102 | 100 | 99 | 10 | 100 | 101 | 101 |
| Steering stability on ice and snow (score) | 108 | 110 | 110 | 110 | 108 | 110 | 108 | 112 |

What is claimed is:
1. A pneumatic tire comprising:
 a tread portion being provided with a circumferentially and continuously extending shoulder main groove and a circumferentially and continuously extending crown main groove to form a middle land portion therebetween;
 the middle land portion comprising a ground contact surface, a crown side sidewall, a shoulder side sidewall, a crown side corner portion formed between the ground contact surface and the crown side sidewall, and a shoulder side corner portion formed between the ground contact surface and the shoulder side sidewall;

the middle land portion being provided with an inner lug groove extending from the crown main groove and terminating within the middle land portion, an outer lug groove extending from the shoulder main groove and terminating within the middle land portion, and sipes, wherein the inner lug groove is inclined at an angle with respect to an axial direction of the tire such that an acute angled portion and an obtuse angled portion is formed on the ground contact surface between the crown main groove and the inner lug groove, the outer lug groove is inclined at an angle with respect to an axial direction of the tire such that an acute angled portion and an obtuse angled portion is formed on the ground contact surface between the shoulder main groove and the outer lug groove, and the sipes extend from the crown main groove to the shoulder main groove;

the crown side corner portion comprising an inner chamfer portion and an inner non-chamfered portion, the inner chamfered portion comprising an inner circumferential first end in communication with the inner lug groove through the acute angled portion on a side of the crown main groove and an inner circumferential second end in communication with one of the sipes, the inner non-chamfered portion being in communication with the inner lug groove through the obtuse angled portion on a side of the crown main groove; and the shoulder side corner portion comprising an outer chamfer portion and an outer non-chamfered portion, the outer chamfered portion comprising an outer circumferential first end in communication with the outer lug groove through the acute angled portion on a side of the shoulder main groove and an outer circumferential second end in communication with one of the sipes, the outer non-chamfered portion being in communication with the outer lug groove through the obtuse angled portion on a side of the shoulder main groove.

2. The pneumatic tire according to claim 1, wherein each of the inner and outer chamfered portions is formed in a planar shape in a cross-section of the land portion.

3. The pneumatic tire according to claim 1, wherein each of the inner and outer lug grooves has a width decreasing toward a terminal end in stages.

4. The pneumatic tire according to claim 1, wherein the inner chamfered portion extends from the inner lug groove to a first side in a circumferential direction of the tire and the outer chamfered portion extends from the outer lug groove on to a second side which in an opposite side to the first side in the circumferential direction of the tire.

5. The pneumatic tire according to claim 1, wherein the inner and outer chamfered portions have depths in a range of from 0.30 to 0.70 times depths of the crown and shoulder main grooves, respectively.

6. The pneumatic tire according to claim 5, wherein each of the shoulder and crown main grooves extends in a straight shape along a circumferential direction of the tire, and an edge of each of the inner and outer chamfered portions on the ground contact surface extends in a straight shape along the circumferential direction of the tire.

7. The pneumatic tire according to claim 6, wherein the edge of each of the inner and outer chamfered portions extends in parallel with an edge of each of the inner and outer chamfered portions on the ground contact surface.

8. The pneumatic tire according to claim 1, wherein the inner and outer non-chamfered portions are provided between the sipes which are arranged adjacently in the circumferential direction of the tire.

9. The pneumatic tire according to claim 8, wherein each of the shoulder and crown main grooves extends in a straight shape along a circumferential direction of the tire, and an edge of each of the inner and outer chamfered portions on the ground contact surface extends in a straight shape along the circumferential direction of the tire.

10. The pneumatic tire according to claim 1, wherein the shoulder main groove is disposed proximate to a tread edge.

11. The pneumatic tire according to claim 1, wherein
the sipes comprise a plurality of middle sipes arranged adjacently in a circumferential direction of the tire between the inner lug groove and the outer lug groove,
the outer chamfered portion is provided between one of the plurality of middle sipes and the outer lug groove, and
at least one non-chamfered portion, on the side of the shoulder main groove, is provided between the plurality of middle sipes arranged adjacently in the circumferential direction of the tire.

12. The pneumatic tire according to claim 11, wherein
the inner chamfered portion is provided between one of the plurality of middle sipes and the inner lug groove, and
at least one non-chamfered portion, on the side of the crown main groove, is provided between the plurality of middle sipes arranged adjacently in the circumferential direction of the tire.

13. The pneumatic tire according to claim 1, wherein
the sipes comprise a plurality of middle sipes arranged adjacently in a circumferential direction of the tire between the inner lug groove and the outer lug groove,
the inner chamfered portion is provided between one of the plurality of middle sipes and the inner lug groove, and
at least one non-chamfered portion, on the side of the crown main groove, is provided between the plurality of middle sipes arranged adjacently in the circumferential direction of the tire.

* * * * *